United States Patent [19]

Teare

[11] Patent Number: 5,030,502

[45] Date of Patent: Jul. 9, 1991

[54] CEMENTITIOUS CONSTRUCTION PANEL

[76] Inventor: John W. Teare, 26 Hollytree Ct., Hamilton, Ohio 45011

[21] Appl. No.: 573,544

[22] Filed: Aug. 27, 1990

Related U.S. Application Data

[63] Continuation-in-part of Ser. No. 473,895, Feb. 2, 1990, abandoned.

[51] Int. Cl.$^5$ .............................................. B32B 23/02
[52] U.S. Cl. ................................. 428/143; 428/192; 428/247; 428/251; 428/255; 428/703
[58] Field of Search ............... 428/192, 193, 247, 251, 428/255, 703

[56] References Cited

U.S. PATENT DOCUMENTS

| | | | |
|---|---|---|---|
| 3,284,480 | 11/1966 | Dinkel | 52/600 |
| 4,203,788 | 5/1980 | Clear | 156/44 |
| 4,450,022 | 5/1984 | Galer | 156/42 |
| 4,488,409 | 12/1984 | Galer et al. | 106/89 |
| 4,504,335 | 3/1985 | Galer | 156/42 |
| 4,518,652 | 5/1985 | Willoughby | 428/312.4 |
| 4,916,004 | 4/1990 | Ensminger et al. | 428/703 |

OTHER PUBLICATIONS

Wonder-Board Product Information and Installation Guide Modulars, Inc., Hamilton, Ohio.
Durock Tile Backer Board, Product Folder SA-932, Durabond Division, US.G. Industries Inc., Chicago, Ill.

Primary Examiner—James J. Bell

[57] ABSTRACT

The invention relates to a light-weight concrete construction panel having a layer of reinforcing mesh bonded to each of the two faces. Such panels are used on walls and floors as backerboards for the installation of ceramic tile and other facing materials. In this invention the web of mesh or other fabric wraps around the edge of the panel and is bonded in place on the top and bottom faces. The strip of mesh covering the edge is left unbonded and open; when two panels are placed abutting each other the unbonded strip of mesh along the edge captures the mortar that is applied to fill the joint. This permits improved edge-to-edge bonding.

10 Claims, 3 Drawing Sheets

CEMENTITIOUS CONSTRUCTION PANEL

This application is a continuation-in-part of my copending patent application Ser. No. 473,895, filed Feb. 2, 1990 now abandoned.

This invention relates to an improved reinforced cementitious construction panel such as gypsum wallboard, lightweight concrete panels, fabric reinforced tile backerboards, and the like. In general, such cementitious panels are fastened to the framing of a building and serve as a backerboard for the installation of a facing material, for example, ceramic tile, thin brick, thin marble panels and stucco. However, they also are used without a facing material as with the application of a paint.

More particularly this invention relates to a cementitious backerboard comprising a panel having a core layer of light-weight concrete with each of the two faces being covered with a layer of reinforcing fabric bonded to the core layer. Such cementitious backerboards are described in the U.S. Pat. No. 3,284,980 (1966) P. E. Dinkel. These panels are nailable and are readily fastened to the framing members. Furthermore they are substantially unaffected by water and consequently find extensive use in wet areas such as shower enclosures, bathtub surrounds, kitchen areas and entryways, as well as on building exteriors.

Cementitious backerboards are generally produced using a core mix of water, light-weight aggregate (e.g., expanded clay, expanded slag, expanded shale, perlite, expanded glass beads, polystyrene beads, and the like) and a cementitious material (e.g., portland cement, magnesia cement, alumina cement, gypsum and blends of such materials). A foaming agent as well as other additives can be added to the mix.

The reinforcing fabric most generally employed is a fiber glass scrim and, in particular, is a woven mesh of vinyl coated fiber glass yarns. The yarn count per inch of the fabric varies from 8×8 to 12×20, depending upon the size of the openings in the mesh or scrim for passage of the bonding material through the fabric. Other pervious fabrics having suitable tensile strength, alkali resistance and sufficiently large pores or openings may be employed.

Very commonly the reinforcing fabric is bonded to the surface of the core layer with a thin coating of portland cement slurry, with or without some fine aggregate added. Alternatively, the core mix can be sufficiently fluid to be vibrated or forced through the openings of the reinforcing fabric to cover the fabric and to bond it to the core layer. This is described in U.S. Pat. No. 4,450,022 (Galer).

In the installation of cementitious backerboards, as for example in the construction of a wall section, it is standard practice to leave a small space (e.g. ⅛") between two panels where the two abut which then must be filled with mortar or the like and tape applied over this joint. This filling and taping of the joints between the panels is carried out in order to bridge across the gap between tho panels and thereby provide a continuous surface on which to install the ceramic tile or other facing material. Such filling and taping is specified in the "Wonder-Board" brochure published by Modulars, Inc., and in the "Durock" brochure published by the Durabond Division of U. S. G. Industries, Inc.

Also, the filling and taping of joints between panels is specified by the backerboard manufacturers for the intended purpose of securing edge-to-edge bonding of the panels. This is to obtain a stronger integral wall structure and thereby reduce wall surface movement and avoid cracking of the ceramic tile or the like.

However, edge-to-edge bonding can be achieved only in part due to the manner in which the backerboard panels are conventionally installed. This is illustrated in FIG. 1. Wall section 1 consists of framing members 2 (wood or steel studs) floor plate 3, top plate 4 and backerboard panels 5 attached to the studs with nails or screws 6. The backerboard panels 5 conventionally are installed in the horizontal position in order to catch the stud spacing, normally 16" o.c. A gap 7 of about ⅛", is left between the longitudinal edges of the panels. A problem arises when the effort is made to fill the longitudinal joint, that is gap 7, with mortar. Since there is only empty space in back of the gap 7, except at the studs, the mortar tends to fall through and cannot be packed, leaving voids in the joint. A gap 8 also is left between ends 9 of the panels but since the abutting ends 9 are secured to a stud the end joints 8 are provided with a backing and can be filled solid. All joints must then be covered, according to the manufacturer's specifications, with a tape 10, normally 2" wide.

Another problem area with the present type of backerboard panels is the taping step. Not only is this an extra step in the installation of ceramic tile or other facing material, but the tape is also an obstruction in the tile setting operation. Since the tape is applied over the surface of the backerboard at the joints it leaves a raised band or strip which tends to catch the tile installer's notched trowel as the installer is spreading the tile setting mortar, slowing the work and, in some cases, tearing away the tape. In addition, each strip of tape presents a raised area on an otherwise flat surface. Since the tile setter is required to set the tile in a smooth plane, in particular on a flat wall, the tile setting mortar must be applied in a heavier layer in the tape-free areas, in order to compensate for the raised areas of the taped joints.

Consequently the elimination of the need for taping the joints between the panels would materially simplify the installation of facing materials, thereby increasing the productivity of the installer. Also, a better installation job is made possible, the facing material being set in a truer plane.

PRIOR ART

U.S. Pat. No. 3,284,980 (1966) P. E. Dinkel, discloses a fabric reinforced tile backerboard and illustrates the taping of the joints between backerboard panels.

U.S. Pat. No, 4,203,788 (1980) T. E. Clear, discloses a method and apparatus for producing fabric reinforced tile backerboard panels.

U.S. Pat. No. 4,450,022 (1984) R. E. Galer et al describes a modified type of cementitious backerboard in which the same cementitious composition is used both as the core and the bonding material for the reinforcing fabric.

U.S. Pat. No. 4,488,909 (1984) R. E. Galer et al describes in further detail, in column 4, the cementitious composition used in a cementitious backerboard.

U.S. Pat. No. 4,518,652 (1985) M. D. Willoughby, describes formation of a cementitious construction panel based upon gypsum.

U.S. Pat. No. 4,504,335 (1985) R. E. Galer, discloses a modified method for producing fabric reinforced cementitious backerboard.

U.S. Pat. No. 4,916,004 (1990) R. P. Ensminger et al, describes a reinforced cementitious panel in which the reinforcement wraps the edges but is embedded in the core mix.

BRIEF DESCRIPTION OF THE INVENTION

An object of my invention is to provide an improved means of edge bonding cementitious construction panels.

A second object of my invention is to provide cementitious construction panels having greater potential edge-to-edge bonding strength.

A further object of my invention is to eliminate the need for taping the joints between abutting backerboard panels in the installation of ceramic tile or other facing materials.

My invention comprises a fabric reinforced construction panel in which the fabric on at least one of the faces of the panel is wrapped around at least one of the longitudinal edges of the panel and bonded in place on the top and bottom faces of the panel, the edge portion of the fabric being free of material and being open and pervious to receive the joint filling material.

In the preferred embodiment, the panel of my invention comprises a core layer of a mix of portland cement and a light-weight aggregate with a layer of fiber glass scrim covering and bonded to the top face and the bottom face of the core layer, the scrim also wrapping the two longitudinal edges of the core layer, the portion of the scrim wrapping each of the edges being substantially unbonded and being open and pervious to receive the mortar or other joint filling material.

BRIEF DESCRIPTION OF THE DRAWINGS

My invention is more fully described with reference to the drawings, in which.

Figure 1:
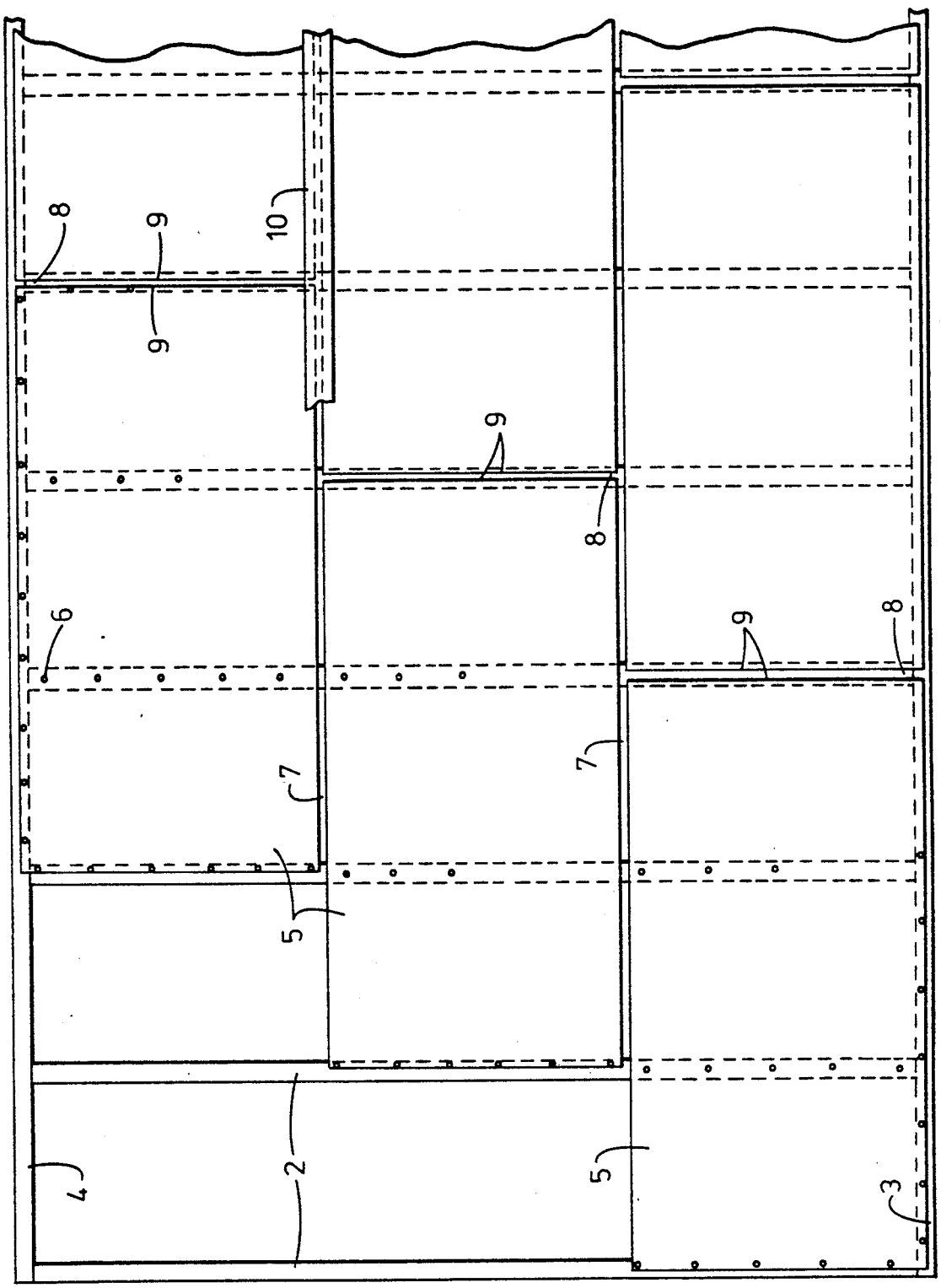
FIG. 1 is a view in front elevation of a typical wall erected with cementitious construction panels.

The typical wall construction shown in FIG. 1 has been described previously in the specification.

Figure 2:
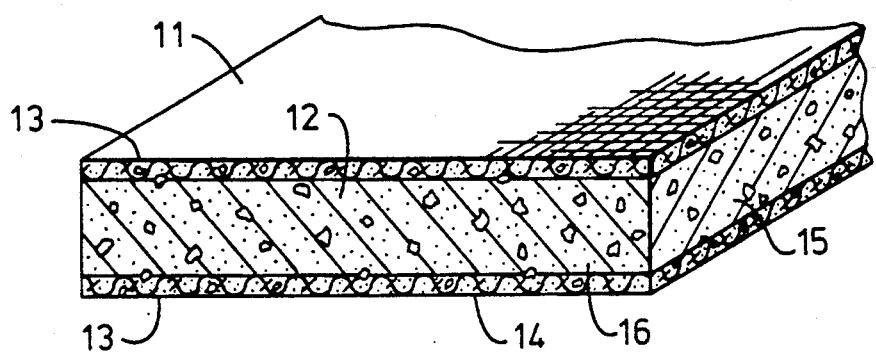
FIG. 2 is a perspective view of an end portion of a cementitious construction panel of the prior art.

FIG. 2 shows a cross-section of a prior art backerboard 11. Such panels normally are ½" thick, three feet wide and 4 to 8 feet long. A core of expanded shale and portland cement is covered on each of its two faces with a layer of fiber glass mesh 13 bonded to the core face with a thin layer 14 of neat portland cement. The edges 15 and ends 16 are bare with the core 12 exposed.

Figure 3:
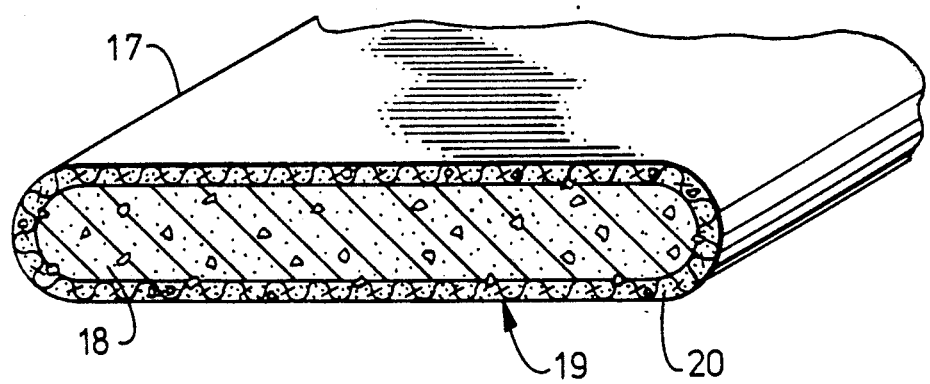
FIG. 3 is a perspective view of an end portion of a second prior art cementitious construction panel.

FIG. 3 shows a cross-section of a second prior art backerboard 17. The core 18 is composed of a foamed portland cement matrix with expanded polystyrene beads and other lightweight aggregate. The core is enclosed by a layer of fiber glass scrim 19, top, bottom and edges, the scrim being embedded in the core composition and bonded to the core layer. None of the scrim is exposed. The one cementitious composition constitutes the core 18 and the surface bonding layer 20.

Figure 4:
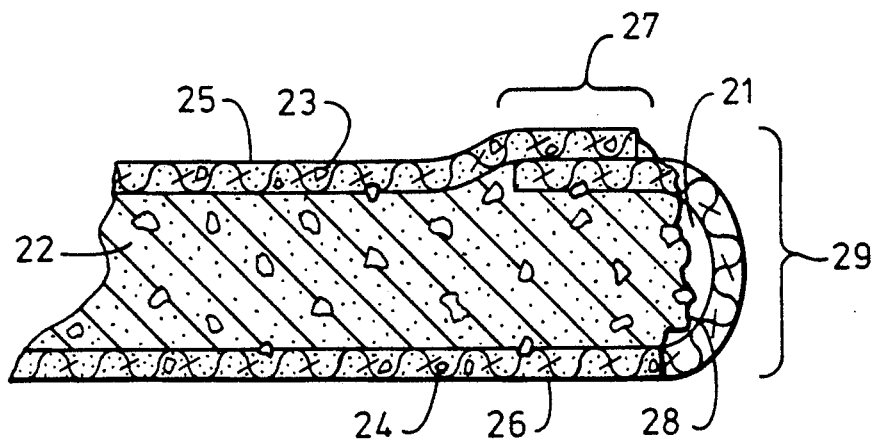
FIG. 4 is a partial cross-sectional view of the cementitious construction panel of my invention.
Figure 5:
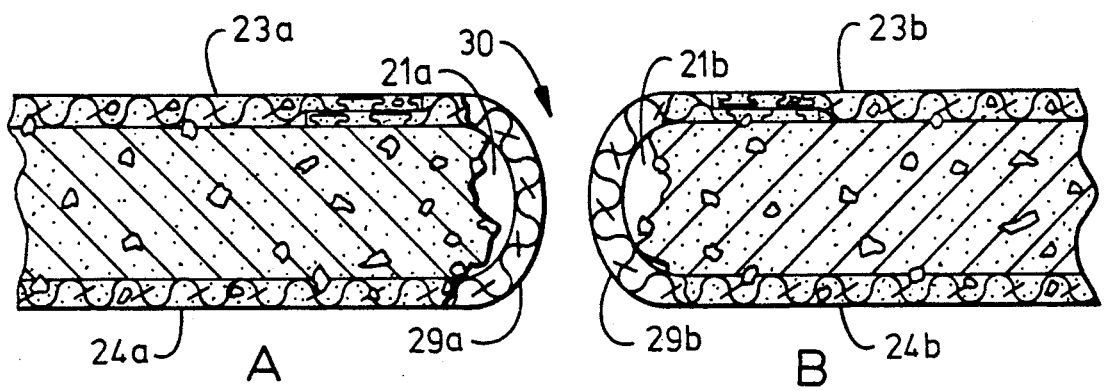
FIG. 5 is a partial cross-sectional view of two of the panels of my invention in abutting position before mortar is applied to form a panel joint.
Figure 6:
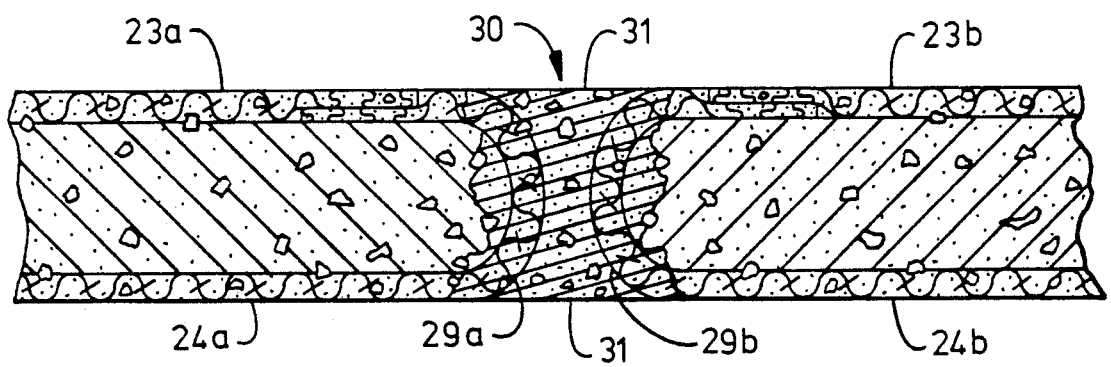
FIG. 6 is the same view as in FIG. 5 showing the mortar in place in the joint.

My invention is shown in FIG. 4, in cross-sectional view; the dimensions are exaggerated in order to more clearly illustrate its structure. The core layer 22 is a light-weight aggregate-portland cement composition. It is covered with a layer of reinforcing fabric, preferably a woven mesh of vinyl coated fiber glass yarns, 23 on top and 24 on the bottom, each bonded to the core with a coating of a cementitious material, 25 on the top and 26 on the bottom. Typically the usual bonding layer is a coating of neat portland cement. In the forming operation the bottom fabric layer 24, of a suitable width, is folded around the edge 28 and a narrow section 27 thereof folded over on to the top of the core along the length of the panel. In a prior step the coating of neat portland cement is applied to that portion of the fabric web 24 which is brought into contact with the bottom of the core. The second layer of fabric 23 is laid down on the top of the core and extends over the portion 27 of the bottom fabric layer; a coating of the cement is applied over the fabric 23 as indicated at 25 to bond it to the core layer 22. The folded over section 27 becomes embedded in the coating of portland cement and becomes united with the web 23. One or both edges of the panel can be wrapped with the bottom layer 24. The fabric actually is much thinner than is shown in FIG. 4, and in the finished product the top surface is substantially flat as shown in FIGS. 5 and 6.

Alternatively the bottom web of fabric 24 can be of sufficient width that it can be folded, not only around the edges of the panel, but also over on to the top of the core so that the edges of this web of fabric 24 are brought together in abutting or over-lapping arrangement, eliminating the top layer 23.

The key element is the section 29 of the fabric layer 24. Preferably, section 29 is clear of cementitious or other material. However, in my invention it is only required that section 29 of the fabric be sufficiently open as to permit penetration of the fabric by the mortar or mastic employed to fill the joint between abutting panels to form an edge-to-edge bond. Thus, while some of the coating of cementitious material applied as a slurry may extend over some of the openings in the pervious fabric along section 29, normally this will not interfere with adequate penetration of the fabric by the mortar or the like for the formation of a good bond with the mesh of the opposing panel.

The fabric web is not necessarily taut around the edge 28; this section 29 preferably is sufficiently slack to allow space behind the fabric at 21 to permit mortar or other material used to fill the joint to come into contact with the core material.

FIGS. 5 and 6 illustrate the formation of an edge-to-edge bond between two fabric reinforced backerboards; in this example glass fiber mesh fabric is employed. A small gap (e.g. ⅛" approx.) is left in the joint 30 between the two panels, A and B. The tile installer fills the joint either before or at the time of the tile setting, by pressing the mortar or other tile installing material into the gap. FIG. 5 shows the condition of the joint before the mortar is applied, while FIG. 6 shows the joint in the filled condition. The mortar 31 enters the openings in the mesh at sections 29a and 29b on the two edges, penetrating into bonding contact with the edges of the two panels, the mesh becoming embedded in the mortar. The joint can be packed solid quite readily due to the retaining action of the mesh.

Figure 7:
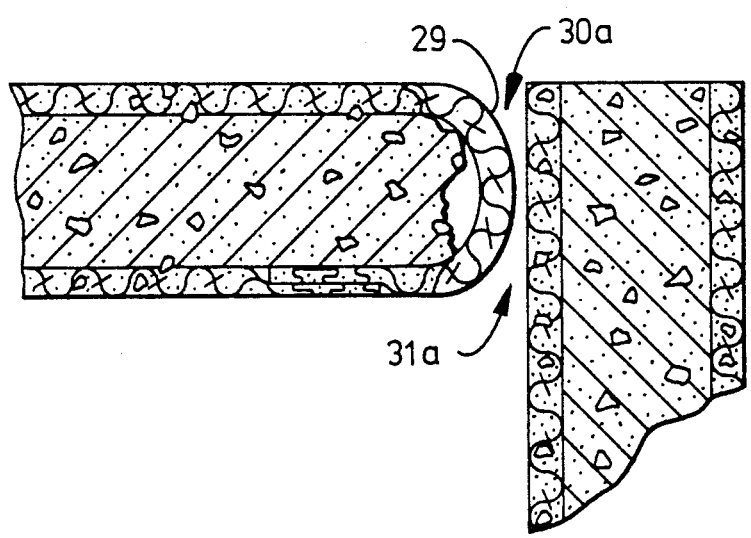
FIG. 7 is a cross-sectional view of one of the panels of my invention forming a corner joint with another panel.

As shown in FIG. 7, a joint can be formed to advantage where only the edge of one panel is provided with the open mesh section 29. Such a situation occurs where two panels form a corner. The open portion of the mesh receives the mortar 31a and holds it in place to fill the joint.

In a representative manufacturing operation for my panel, a continuous web of polyethylene coated paper is laid down on a moving conveyer belt as the carrier sheet, a continuous web of a reinforcing fabric is deposited on the paper web, a portland cement slurry is wiped onto the web of fabric to coat it except on the edge portions that are to be turned up, core composition is deposited on the slurry coated bottom web, the core is shaped to the desired thickness and width of the panel being produced, the edge portions of the fabric web are turned up and folded over the edges with a suitable band of the fabric over-lapping onto the top of the core layer along each edge, a continuous web of reinforcing fabric is laid on top of the core extending sufficiently wide to cover the folded over portions of the lower web, and portland cement slurry is applied to coat the top layer of fabric and to bond it to the core and the folder over portions of the bottom web. The thus produced elongated panel-web is cut into panel lengths and cured, or the panel-web is cured and then cut into panels.

Specimens of cementitious backerboard were edge bonded and tested for tensile strength. The test results, presented in TABLE I, show that the strength of the point formed by edge bonding with the panels of my invention, with no taping, is equal to or superior to that of the joints formed using the filling and taping method of the prior art.

TABLE I

Comparison of Edge-to-Edge Bond Strength
Tensile Strength Tests Performed in Accordance
With ASTM D-1037 (Modified)

1. Joints of "Wonder-Board" Tile Backerboard Identified as "W-B", Prepared According to Instructions of Modulars, Inc.
2. Joints of Wrapped-Edge Backerboard of the Claimed Invention, Identified as "WEB"

| Type of Board | Tape - 2" Fiber Glass | Mortar Type | Tensile Strength lbs./sq. in. |
| --- | --- | --- | --- |
| "W-B" | None applied | Thin Set | 140 |
| "W-B" | Taped | Thin Set | 150 |
| "W-B" | Taped | Thin Set plus latex | 182 |
| WEB | None applied | Thin Set | 181 |
| WEB | None applied | Thin Set plus latex | 191 |

Test results are the average of at least three tests.
Mortar used was "Tile Mate" Premium Dual Purpose thin set mortar, sold by Bostik Construction Products Co.
The "Wonder-Board" tile backerboard (aka glass mesh mesh mortar units) used, was produced by Fin-Pan, Inc., and marketed by Modulars, Inc.
The 2" fiber glass tape used is marketed by Modulars, Inc.

It is thus apparent from the test data that with my novel improved backerboard, the need for taping joints is obviated. With the open-mesh wrapped-edge, the mortar is retained when pressed into the joint, whereas in the prior art type of backerboard the mortar pressed into the joint more often than not falls out on the back, leaving incomplete bonding. A superior edge-to-edge bond is made possible because the mortar is not only brought into bonding contact with the edge of the core, but the mortar joint also is reinforced with the mesh that is present. This novel wrapped-edge backerboard simplifies the work of the tile mechanic and, at the same time a structurally stronger wall or other structure can be achieved with actual edge-to-edge bonding.

What I claim is:

1. A fabric reinforced cementitious construction panel comprising a cementitious core layer and a layer of pervious reinforcing fabric covering each of the two faces of said core layer, said fabric also wrapping at least one of the two longitudinal edges of said panel, said fabric being bonded to each of said two core faces and being unbonded along said wrapped longitudinal edge of said panel.

2. A fabric reinforced cementitious panel consisting of a core layer comprising light-weight aggregate and cementitious material and a layer of pervious reinforcing fabric bonded to each of the two faces of said core layer with cementitious material, at least one of the longitudinal edges of said panel being wrapped with said reinforcing fabric, said reinforcing fabric being open and substantially free of said cementitious material along said panel edge.

3. A fabric reinforced cementitious panel consisting of a core layer comprising light-weight aggregate and cementitious material and a layer of pervious reinforcing fabric covering each of the two faces of said core layer, said fabric also wrapping at least one of the two longitudinal edges of said core layer, said fabric being bonded to each of said two faces of said panel with cementitious material, said fabric being open and unbonded along said wrapped longitudinal edge of said panel.

4. A panel as claimed in claim 1 in which said fabric is bonded to said core faces with a cementitious material.

5. A panel as claimed in claim 3 in which said cementitious material comprises portland cement.

6. A panel as claimed in claim 3 in which said reinforcing fabric is a fiber glass scrim.

7. A panel as claimed in claim 3 in which said reinforcing fabric is a woven mesh of vinyl resin coated fiber glass yarns.

8. A fabric reinforced cementitious panel consisting of a core layer comprising a portland cement material and a light-weight aggregate and a layer of pervious fiber glass scrim bonded to each of the two faces of said core layer with said cementitious material, at least one of the longitudinal edges of said panel being wrapped with said scrim, said scrim being sufficiently open along said panel edge as to permit penetration of joint filling material.

9. A panel as claimed in claim 8 in which said layer of scrim along said panel edge is somewhat slack to provide space between said layer of scrim and said longitudinal panel edge.

10. A fabric reinforced cementitious construction panel comprising a cementitious core layer and a web of pervious reinforcing fabric covering the lower face of said core layer, said fabric also wrapping the two longitudinal edges of said panel and covering at least a portion of the top face of said core layer, said fabric being bonded to said faces of said core layer, said fabric being sufficiently open along said panel edges as to permit penetration of joint filling material.

* * * * *

REEXAMINATION CERTIFICATE (1794th)
United States Patent [19]
Teare

[11] B1 5,030,502
[45] Certificate Issued  Sep. 15, 1992

[54] CEMENTITIOUS CONSTRUCTION PANEL

[76] Inventor: John W. Teare, 26 Hollytree Ct., Hamilton, Ohio 45011

Reexamination Request:
No. 90/002,492, Oct. 21, 1991

Reexamination Certificate for:
Patent No.: 5,030,502
Issued: Jul. 9, 1991
Appl. No.: 573,544
Filed: Aug. 27, 1990

Related U.S. Application Data

[63] Continuation-in-part of Ser. No. 473,895, Feb. 2, 1990, abandoned.

[51] Int. Cl.⁵ .......................... B32B 1/04; B32B 23/02
[52] U.S. Cl. ...................................... 428/193; 428/192; 428/247; 428/251; 428/255; 428/703; 428/70
[58] Field of Search ................ 428/70, 192, 193, 247, 428/251, 255, 703

[56] References Cited
U.S. PATENT DOCUMENTS

4,504,533  3/1985  Altenhöfer et al. ................ 428/70
4,948,647  8/1990  Burkard ................................ 428/70

OTHER PUBLICATIONS

Util-A-Crete Backer Board: For Today's Dramatic New Tile Masterpieces, 09390/Fin. ©1990.
Apr. 1990 *Tile Letter*, p. 31, "Introducing A Backer Board So Superior, It Leaves the Competition Floored."
May/Jun. 1990 *Tile World*, pp. 30-31, 43 & 65, "In A World of Flimsy Excuses, Now There's A Firm Answer", Introducing A Backer Board So Superior, It Leaves the Competition Floored, and Photographs of Util-A-Crete Product.

*Primary Examiner*—James J. Bell

[57] ABSTRACT

The invention relates to a light-weight concrete construction panel having a layer of reinforcing mesh bonded to each of the two faces. Such panels are used on walls and floors as backerboards for the installation of ceramic tile and other facing materials. In this invention the web of mesh or other fabric wraps around the edge of the panel and is bonded in place on the top and bottom faces. The strip of mesh covering the edge is left unbonded and open; when two panels are placed abutting each other the unbonded strip of mesh along the edge captures the mortar that is applied to fill the joint. This permits improved edge-to-edge bonding.

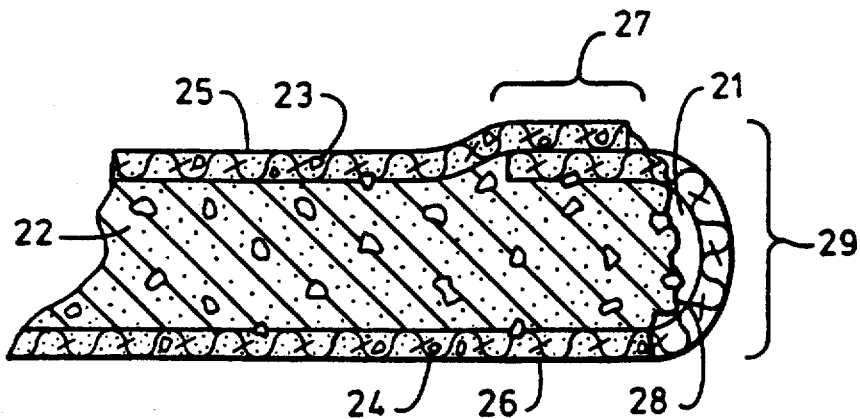

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-7 is confirmed.

Claims 8-10 are cancelled.

* * * * *